US008063787B2

(12) United States Patent
Parker et al.

(10) Patent No.: US 8,063,787 B2
(45) Date of Patent: Nov. 22, 2011

(54) POINT-OF-USE STATUS INDICATOR

(76) Inventors: Kevin L. Parker, Raleigh, NC (US);
Alexander S. Filippenko, Cary, NC
(US); Scott R. Brown, Wake Forest, NC
(US); David R. Glasgow, Wake Forest,
NC (US)

( * ) Notice: Subject to any disclaimer, the term of this patent is extended or adjusted under 35 U.S.C. 154(b) by 56 days.

(21) Appl. No.: 12/653,649

(22) Filed: Dec. 16, 2009

(65) Prior Publication Data

US 2011/0140901 A1 Jun. 16, 2011

(51) Int. Cl.
G08B 1/08 (2006.01)
G08B 21/00 (2006.01)

(52) U.S. Cl. .................. 340/635; 340/679; 340/539.14; 700/22; 700/12; 700/17

(58) Field of Classification Search .......... None
See application file for complete search history.

(56) References Cited

U.S. PATENT DOCUMENTS

| | | | |
|---|---|---|---|
| 4,418,333 A * | 11/1983 | Schwarzbach et al. | 340/4.3 |
| 4,644,320 A | 2/1987 | Carr | |
| 4,858,141 A | 8/1989 | Hart | |
| 5,289,362 A * | 2/1994 | Liebl et al. | 700/22 |
| 5,397,926 A | 3/1995 | Matsui | |
| 5,528,508 A | 6/1996 | Russell | |
| 5,924,486 A | 7/1999 | Ehlers | |
| 6,061,604 A | 5/2000 | Russ | |
| 6,552,525 B2 | 4/2003 | Bessler | |
| 6,734,806 B1 | 5/2004 | Cratsley | |
| 6,828,695 B1 | 12/2004 | Hansen | |
| 6,868,293 B1 * | 3/2005 | Schurr et al. | 700/22 |
| 7,069,161 B2 | 6/2006 | Gristina | |
| 7,110,832 B2 | 9/2006 | Ghent | |
| 7,379,997 B2 * | 5/2008 | Ehlers et al. | 709/224 |
| 7,489,974 B2 * | 2/2009 | Numano | 700/22 |
| 2003/0065560 A1 | 4/2003 | Brown | |
| 2003/0171851 A1 | 9/2003 | Brickfield | |
| 2005/0038571 A1 | 2/2005 | Brickfield | |
| 2005/0043862 A1 | 2/2005 | Brickfield | |
| 2005/0102068 A1 * | 5/2005 | Pimputkar et al. | 700/291 |
| 2006/0123807 A1 * | 6/2006 | Sullivan et al. | 62/129 |
| 2006/0259201 A1 | 11/2006 | Brown | |
| 2006/0259332 A1 | 11/2006 | Brown | |
| 2007/0255461 A1 | 11/2007 | Brickfield | |

* cited by examiner

Primary Examiner — Julie Lieu

(57) ABSTRACT

A point-of-use energy status indicator monitoring the presence or absence of energy at a monitored device that is required for proper operation of a point-of-use device. The point-of-use indicator being in two-way communication with a status determining device that monitors the monitored device. The status determining device being capable of overriding a utility or energy management system curtailment of energy to the monitored device in response to receiving a signal from a means for overriding located in the point-of-use energy status indicator.

28 Claims, 3 Drawing Sheets

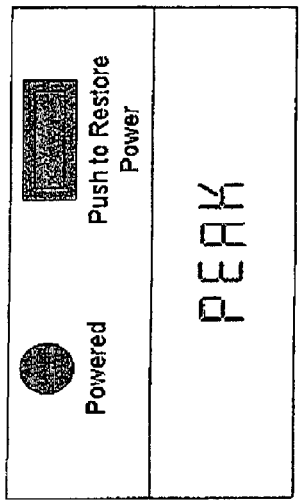
FIG. 1A
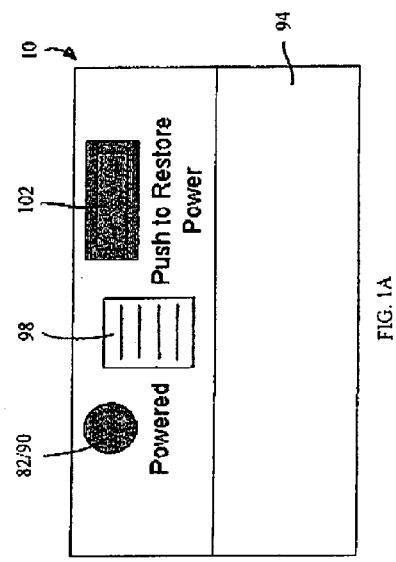
FIG. 1C
FIG. 1E
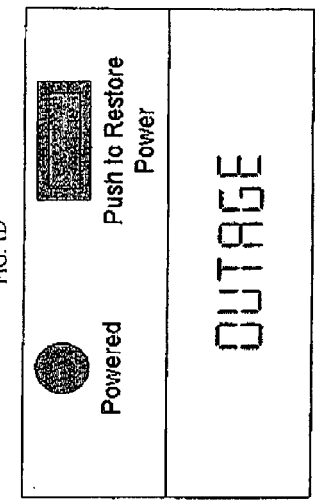
FIG. 1B
FIG. 1D
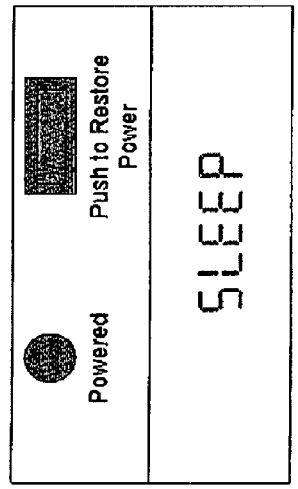
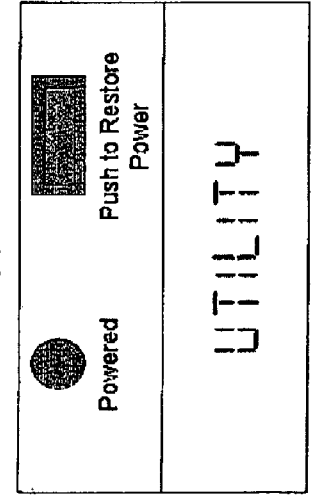
FIG. 1F

POINT-OF-USE STATUS INDICATOR

CROSS-REFERENCE TO RELATED PATENTS

Not applicable

STATEMENT REGARDING FEDERALLY SPONSORED RESEARCH OR DEVELOPMENT

Not applicable

FIELD OF THE INVENTION

The present invention relates to various energy consuming devices that can be remotely controlled by utility companies and/or energy management systems to conserve energy and/or reduce energy cost, and particularly to a point-of-use status indicator for indicating the energy status of such devices.

BACKGROUND OF THE INVENTION

It is well known for utility companies to request voluntary curtailment of commodities such as electricity and gas during peak consumption periods. These curtailments have generally been accomplished by utility demand response systems in which the customer receives some incentive for permitting a utility operated shutoff to be place on certain high energy consuming appliances such as hot water heaters, clothes dryers, HVAC systems, etc. These shutoff devices have generally been located on or near the particular appliance being controlled and usually can not be easily accessed or controlled by the customer. Home and small businesses owners have also voluntarily restricted commodity consumption to reduce utility cost. This has generally been accomplished by manually operating the circuit breakers for high energy using appliances to prohibit use during peak and/or high cost usage time. Manual curtailment generally requires access to the electrical service entrance panel to turn the appliance circuit breakers ON and OFF, which is extremely inconvenient if use of the curtailed appliance is required immediately. Computer controlled energy management systems are now being developed for residential and small business use. These systems automatically monitor energy consumption, utility rates, peak usage periods, etc., and control energy costs by curtailing energy usage according to criteria selected by the resident or business owner, such as energy cost, peak usage time or time of day, which are programmed into the system.

SUMMARY OF THE INVENTION

The present invention provides a point-of-use status indicator and an energy curtailment override device. The status indicator indicates to a potential user of a particular point-of-use device, the power status of a monitored device that could be the particular point-of-use device or a remote appliance or device required for proper use of the particular point-of-use device. The power status being one of power available at the monitored device or power not available at the monitored device. If the monitored device is not receiving energy from a power source the indicator provides a user defined message indicating why energy is not being supplied to the monitored device. Example messages could be SLEEP indicating a user initiated energy curtailment, UTILITY indicating a utility company demand response event, PEAK indicating a peak energy cost curtailment or OUTAGE indicating a utility company outage. The indicator can also indicate how long power has been curtailed. In some applications, the status indicator can also indicate to the potential user whether the available power source for the monitored device is from the utility or a backup generator. The override device permits the potential user to over ride a utility or voluntarily initiated energy curtailment of the monitored device from the point-of-use location.

BRIEF DESCRIPTION OF THE DRAWINGS

The features of the invention will be more clearly understood from the following detailed description of the invention read together with the drawings in which:

FIGS. 1A-1F illustrate in general various embodiments of a point-of-use status indicator and over ride device in accordance with the present invention.

Figure 2:
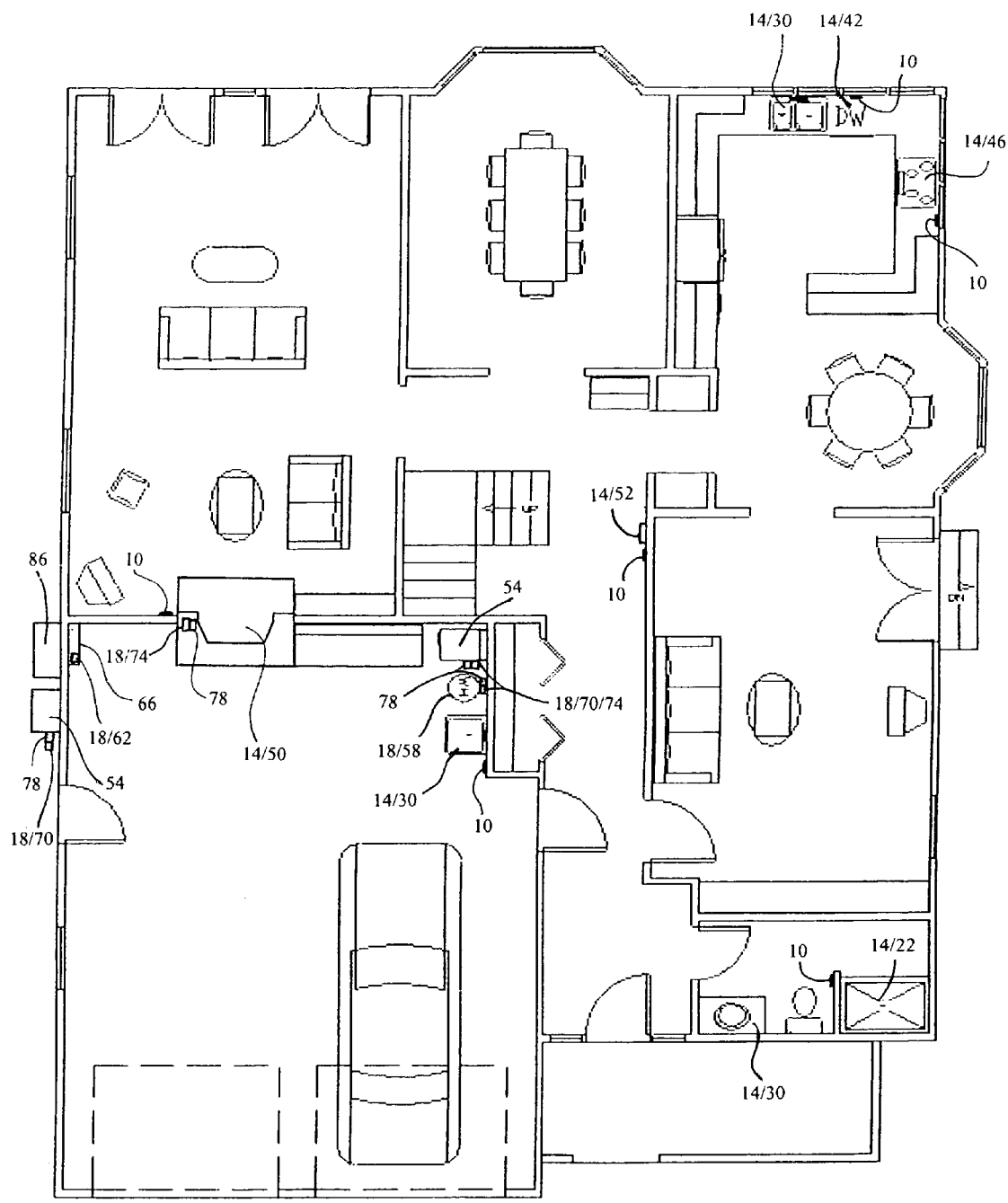
FIG. 2 illustrates in general a first floor plan of a residence having several energy using devices subject to utility or voluntary energy curtailment and the placement of point-of-use status indicator and over ride devices.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIGS. 1A-1F illustrate various embodiments of a point-of-use status indicator of the present invention and generally indicated by reference numeral 10.

Figure 3:
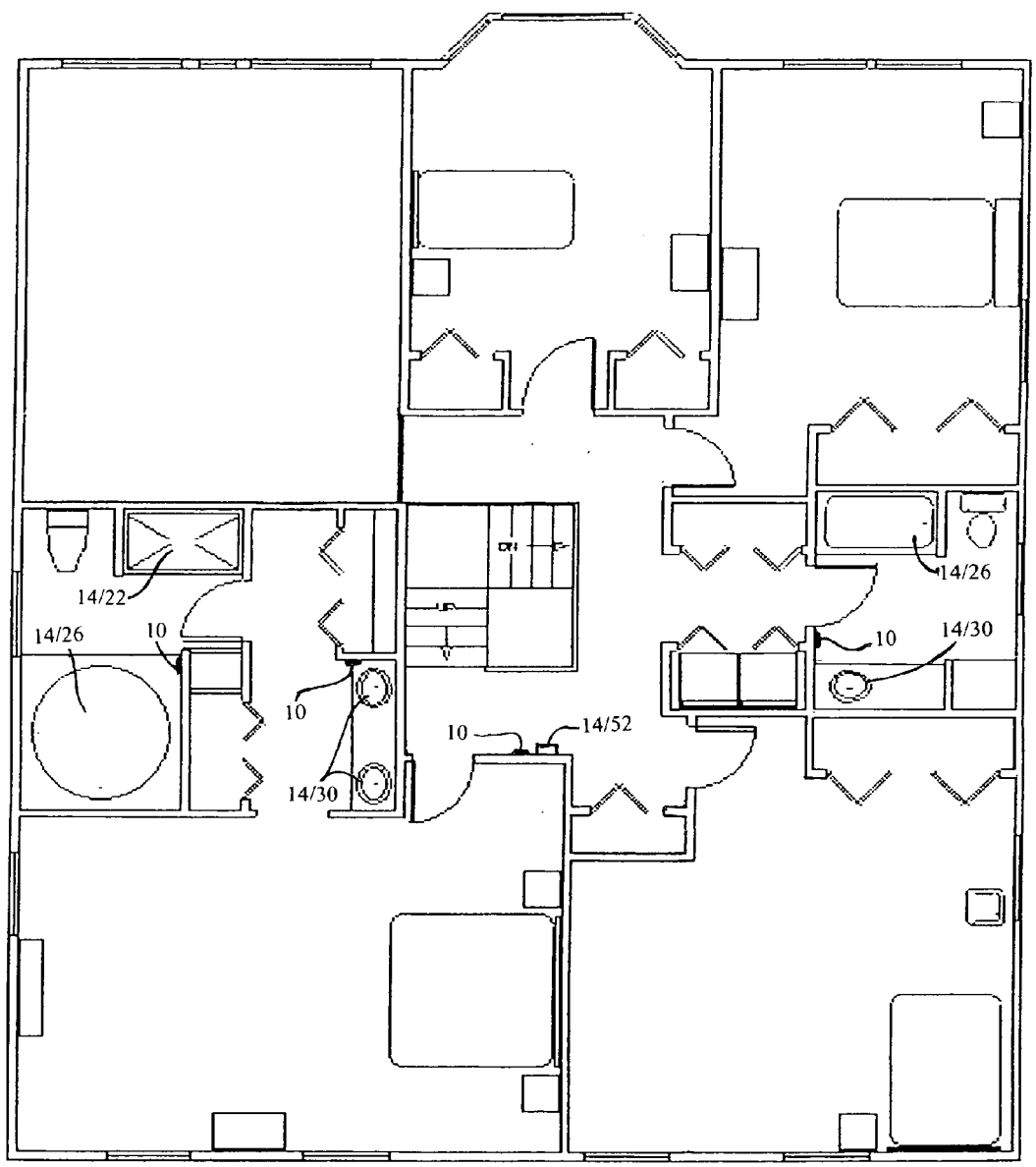
FIG. 3 illustrates in general a second floor plan of the residence of FIG. 2.

Referring now to FIGS. 2 and 3, which represent the floor plan of a typical two story residence, the invention will be described in greater detail. The point-of-use status indicator 10 can be located either on or near a point-of-use appliance or device 14 and indicates the status of a monitored device 18, which is required for proper operation of the point-of-use device 14. The point-of-use device 14 can include appliances or devices such, as but not limited to, a shower 22, bath tub 26, faucet 30, clothes washer 34, clothes dryer 38, dish washer 42, electric or gas range and oven 46, gas logs 50 or a thermostat 52 controlling a HVAC system that can include A/C, heat pump, gas or electric furnace (generically indicated by reference numeral 54) etc., that are spread throughout the residence, as shown in FIGS. 2 and 3. The monitored device 18 is generally, but not always, an appliance or device located remotely from the point-of-use device 14. The monitored device 18 can be the point-of-used device 14 or other appliances or devices such as, but not limited to, a hot water heater 58, a remotely operable branch circuit breaker 62 in a load center 66, a relay or remotely operable electrical switch, generally indicated as 70, or an electrically operated gas or oil valve 74 controlling the electrical, gas or oil power required for proper operation of the point-of-use devices 14 indicated above.

A status determining device 78, located at the monitored device 18, determines the presence or absence of power at the monitored device 18 and is linked by wired or wireless two-way communications means to the status indicator 10. The status determining device 78 can be an integral part of the monitored device 18 or a separate relay or sensor of appropriate type to determine the presence of power (electricity, gas, oil) at the monitored device 18.

Referring again to FIGS. 1A-1F, each point-of-use status indicator 10 is associated with a particular point-of-use device 14 and includes a power indicator 82 that indicates whether the monitored device 18, required for proper operation of the associated point-of-use device 14, is or is not receiving energy from the utility company or other source, such as a generator 86 (FIG. 2). In its simplest form, the power indication 82 can be a LED'90, which is illuminated if the monitored device 18 is not receiving power. If the monitored device 18 is not receiving power a display 94 can provide an indication of the reason energy is not being supplied. This can be a user defined message or a menu selectable message. Example energy curtailment status messages, such as PEAK, SLEEP, RESTORED 2 HRS, UTILITY and OUTAGE are shown on the displays 94 in FIGS. 1B-1F. The messages can be provided as text messages on display 94 as shown in the figures or as an audible recording through a small speaker 98. The status indicator 10 can also include a means 102, such as a button, for overriding a curtailed monitored device 18. The override button 102 is also linked to the monitored device 18, by wired or wireless means, for providing an override signal to the monitored device 18. Depending on the type of monitored device 18 being overridden, one push of the override button 102 can either provide an override of the monitored device 18 until the next curtailment event or for some preset time period, such as 30 minutes. A second push of the override button 98 can either reinstate the curtailment of the monitored device 18 or add an additional preset time period to the override. The status indicator 10 can also include an occupancy sensor (not shown) for initiating the status indicator 10 operation when a potential point-of-use device user enters a room in which the point-of-use device 14 is located. Since the status indicator 10 is essentially a stand alone device and is intended to operate during a power outage it also includes a battery (not shown) for power.

We claim:

1. A point-of-use energy status indicator comprising:
   a first display indicating the status of energy provided by a utility to a monitored device required for proper operation of an appliance or device located at the point-of-use;
   a second display indicating a reason for which energy provided by the utility is not available at the monitored device, at least one of which is an energy curtailment imposed by one of the utility or an energy management system;
   means for overriding the energy curtailment imposed on the monitored device by either the utility or the energy management system.

2. The point-of-use energy status indicator of claim 1, wherein the first indicator includes at least one of a red indicating device for indicating the utility energy OFF status or a green indicating device for indicating the utility energy ON status.

3. The point-of-use energy status indicator of claim 2, wherein the first indicator is a LED.

4. The point-of-use energy status indicator of claim 1, wherein the second indicator comprises a text message display.

5. The point-of-use energy status indicator of claim 4, wherein the text message is defined by the user.

6. The point-of-use energy status indicator of claim 1, wherein the point-of-use energy status indicator further includes a microprocessor and means for two-way communications with a status determining device monitoring energy to the monitored device.

7. The point-of-use energy status indicator of claim 6, wherein the means for two-way communications can be hard wired or wireless.

8. The point-of-use energy status indicator of claim 6, wherein the means for two-way communications is a ZigBee device.

9. The point-of-use energy status indicator of claim 6, wherein the status determining device can be remotely operated by the means for overriding to restore energy to the monitored device.

10. The point-of-use energy status indicator of claim 6, wherein the status determining device is a remotely controllable circuit breaker.

11. The point-of-use energy status indicator of claim 6, wherein the status determining device is a relay.

12. The point-of-use energy status indicator of claim 1, further including a housing for supporting and protecting the first and second displays, the means for overriding and their associated electronics, the housing being configured for attachable placement on, to or near the point-of-use appliance or device.

13. A point-of-use energy status indicator comprising:
   a first status indicator for indicating the status of energy at a monitored device required for proper operation of a point-of-use device;
   a second status indicator for indicating a reason for which energy is not available at the monitored device;
   a means for overriding an energy curtailment imposed on the monitored device by the utility or an energy management system.

14. The point-of-use energy status indicator of claim 13, wherein the first indicator can be either a visual indicator or an audible indicator.

15. The point-of-use energy status indicator of claim 13, wherein the second indicator can be either a visual indicator or an audible indicator.

16. The point-of-use energy status indicator of claim 13, wherein the second indicator can be a text message display.

17. The point-of-use energy status indicator of claim 16, wherein the text message is defined by the user.

18. The point-of-use energy status indicator of claim 13, wherein the monitored device and the point-of-use device are remote from one another.

19. The point-of-use energy status indicator of claim 13, wherein the monitored device and the point-of-use device are the same.

20. The point-of-use energy status indicator of claim 13, further includes a microprocessor and means for two-way communications with a status determining device in electrical communication with the monitored device.

21. The point-of-use energy status indicator of claim 20, wherein the means for two-way communications can be hard wired or wireless.

22. The point-of-use energy status indicator of claim 20, wherein the status determining device can be remotely operated by the means for overriding to restore utility energy to the monitored device.

23. The point-of-use energy status indicator of claim 20, wherein the status determining device is a remotely controllable circuit breaker.

24. The point-of-use energy status indicator of claim 20, wherein the status determining device is a relay.

25. The point-of-use energy status indicator of claim 20, wherein the monitored device is a water heater and the point-of-use device can be any one of a shower, a bath tub, a dishwasher, a clothes washer or a sink faucet.

26. The point-of-use energy status indicator of claim 13, wherein the reasons for which energy from the utility is not available at the first appliance or device can be selected from a menu or user defined.

27. The point-of-use energy status indicator of claim 13, wherein the reasons for which energy from the utility is not available at the monitored device can include utility demand response, peak demand period, energy management curtailment, circuit breaker tripped, circuit breaker off, utility power outage, backup generator.

28. The point-of-use energy status indicator of claim 13, wherein the point-of-use status indicator can include an occupancy sensor for initiating the status indicator operation when a potential point-of-use device user enters a room in which the point-of-use device is located.

* * * * *